(12) United States Patent
Gilb et al.

(10) Patent No.: US 8,155,712 B2
(45) Date of Patent: Apr. 10, 2012

(54) LOW POWER VERY HIGH-DATA RATE DEVICE

(75) Inventors: James P. K. Gilb, San Deigo, CA (US); Jeffrey M. Gilbert, Palo Alto, CA (US); Sheung Li, Mountain View, CA (US); Karim Nassiri-Toussi, Belmont, CA (US)

(73) Assignee: SIBEAM, Inc., Sunnyvale, CA (US)

( * ) Notice: Subject to any disclaimer, the term of this patent is extended or adjusted under 35 U.S.C. 154(b) by 936 days.

(21) Appl. No.: 11/726,874

(22) Filed: Mar. 22, 2007

(65) Prior Publication Data

US 2007/0224951 A1    Sep. 27, 2007

Related U.S. Application Data

(60) Provisional application No. 60/785,824, filed on Mar. 23, 2006.

(51) Int. Cl.
    H04B 1/38    (2006.01)
(52) U.S. Cl. .................. 455/574; 455/127.5; 455/343.1
(58) Field of Classification Search ............... 455/562.1, 455/574, 575.7, 103, 127.1, 127.2, 127.3, 455/127.5, 343.1
    See application file for complete search history.

(56) References Cited

U.S. PATENT DOCUMENTS

| | | | |
|---|---|---|---|
| 5,623,269 A | 4/1997 | Hirshfield et al. | |
| 6,144,339 A | 11/2000 | Matsumoto et al. | |
| 6,856,284 B1 | 2/2005 | Cangiani | |
| 7,532,600 B2 * | 5/2009 | Hu et al. | 370/335 |
| 2004/0033812 A1 * | 2/2004 | Matsunaga et al. | 455/557 |
| 2004/0048580 A1 * | 3/2004 | Lunn et al. | 455/73 |
| 2004/0137949 A1 | 7/2004 | Harris | |
| 2005/0096058 A1 * | 5/2005 | Warner et al. | 455/446 |
| 2005/0215264 A1 * | 9/2005 | Subramaniam et al. | 455/452.2 |
| 2005/0227723 A1 | 10/2005 | Lee et al. | |
| 2005/0259627 A1 | 11/2005 | Song et al. | |
| 2006/0035676 A1 | 2/2006 | Sayers et al. | |
| 2006/0068854 A1 * | 3/2006 | Sandhu | 455/574 |
| 2006/0246853 A1 * | 11/2006 | Nakao | 455/101 |
| 2007/0046539 A1 | 3/2007 | Mani et al. | |

FOREIGN PATENT DOCUMENTS

| | | |
|---|---|---|
| EP | 1746735 A1 | 1/2007 |
| WO | WO 95/26116 A | 9/1995 |
| WO | WO 2005/048486 | 5/2005 |

OTHER PUBLICATIONS

European Office Action for European Patent Application No. 07753954.2, Dec. 30, 2009, 4 Pgs.
Notification of Transmittal of the International Search Report and the Written Opinion, for PCT/US2007/007370, mailed Oct. 17, 2008, pp. 21 total.
Notification concerning Transmittal of International Preliminary Report on Patentability, for PCT/US2007/007370, mailed Dec. 11, 2008, pp. 12 total.

* cited by examiner

*Primary Examiner* — Nguyen Vo
(74) *Attorney, Agent, or Firm* — Blakely, Sokoloff, Taylor & Zafman LLP

(57) ABSTRACT

A radio frequency (RF) transmitter has a plurality of digitally controlled phased array antennas coupled to and controlled by the processor to transmit data. The processor is to enable one or more antennas to be turned off during a use of the apparatus to reduce a power consumption of the apparatus.

22 Claims, 12 Drawing Sheets

LOW POWER VERY HIGH-DATA RATE DEVICE

RELATED APPLICATIONS

This application claims the benefit of U.S. Provisional Application No. 60/785,824 filed on Mar. 23, 2006, the contents of which are incorporated herein by reference.

FIELD OF THE INVENTION

The present invention relates to the field of wireless communication; more particularly, the present invention relates to low power very high data rate wireless communication device that uses adaptive beamforming.

BACKGROUND OF THE INVENTION

Consumer electronic (CE) wireless devices may belong to two types: fixed CE wireless devices and mobile CE wireless devices. Fixed CE wireless devices may be found located in a remote or enclosed area such as behind doors of an entertainment center. Fixed CE wireless devices thus need to have a longer range because of the obstacles. However, fixed CE wireless devices have essentially unlimited power available since there are powered by an AC power source.

Mobile CE wireless devices are typically closer and can be moved around to improve a wireless quality link. However, mobile CE wireless devices operate with a finite amount of stored energy in a battery and have a maximum power level.

SUMMARY OF THE INVENTION

Radio frequency (RF) transmitter and receiver have a plurality of digitally controlled phased array antennas coupled to and controlled by the processor to transmit or receive data. The processor is to enable one or more antennas to be turned off during a use of the apparatus to reduce a power consumption of the apparatus. The selection and number of antennas to be turned off may be based on a user selection, a type of power source connected to the transmitter and/or receiver, or a feedback of data rate and signal quality, among others.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
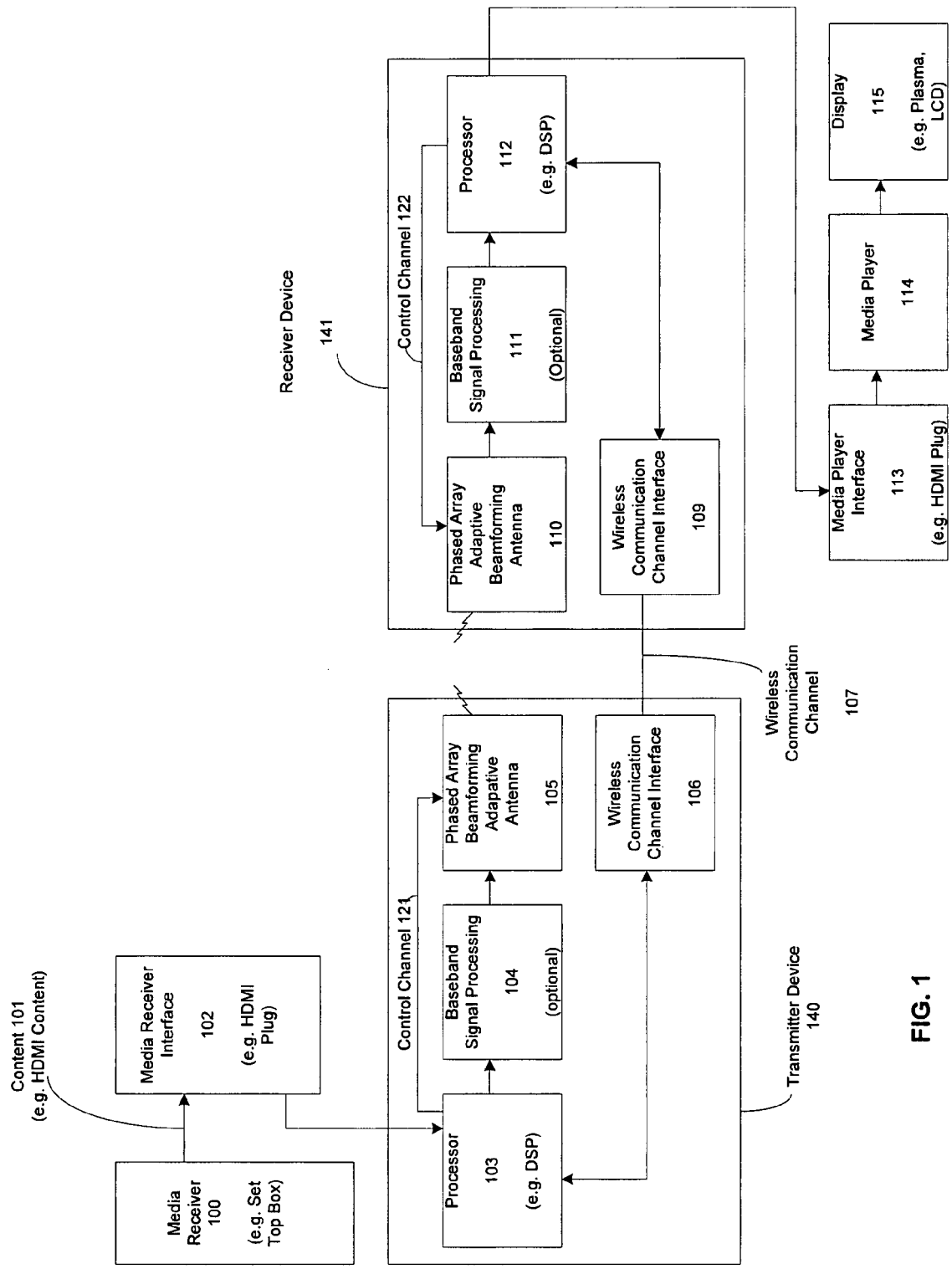
FIG. 1 is a block diagram of one embodiment of a communication system.

An apparatus and method for wireless communication is disclosed. In one embodiment, the wireless communication occurs using a wireless transceiver with an adaptive beamforming antenna. As would be apparent to one skilled in the art, the wireless communication could occur with a wireless receiver or transmitter.

In one embodiment, the power consumption of the wireless transceiver may be reduced by using only a portion of the antennas in the wireless transceiver. In accordance with another embodiment, the power consumption of the wireless transceiver may also be reduced by transmitting only a portion of the data, or by transmitting with a reduced data rate.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An Example of a Communication System

FIG. 1 is a block diagram of one embodiment of a communication system. Referring to FIG. 1, the system comprises media receiver 100, a media receiver interface 102, a transmitting device 140, a receiving device 141, a media player interface 113, a media player 114 and a display 115.

Media receiver 100 receives content from a source (not shown). In one embodiment, media receiver 100 comprises a set top box. The content may comprise baseband digital video, such as, for example, but not limited to, content adhering to the HDMI or DVI standards. In such a case, media receiver 100 may include a transmitter (e.g., an HDMI transmitter) to forward the received content.

Media receiver 101 sends content 101 to transmitter device 140 via media receiver interface 102. In one embodiment, media receiver interface 102 includes logic that converts content 101 into HDMI content. In such a case, media receiver interface 102 may comprise an HDMI plug and content 101 is sent via a wired connection; however, the transfer could occur through a wireless connection. In another embodiment, content 101 comprises DVI content.

In one embodiment, the transfer of content 101 between media receiver interface 102 and transmitter device 140 occurs over a wired connection; however, the transfer could occur through a wireless connection.

Transmitter device 140 wirelessly transfers information to receiver device 141 using two wireless connections. One of the wireless connections is through a phased array antenna with adaptive beamforming. The other wireless connection is via wireless communications channel 107, referred to herein as the back channel. In one embodiment, wireless communications channel 107 is uni-directional. In an alternative embodiment, wireless communications channel 107 is bi-directional.

Receiver device 141 transfers the content received from transmitter device 140 to media player 114 via media player interface 113. In one embodiment, the transfer of the content between receiver device 141 and media player interface 113 occurs through a wired connection; however, the transfer could occur through a wireless connection. In one embodiment, media player interface 113 comprises an HDMI plug. Similarly, the transfer of the content between media player interface 113 and media player 114 occurs through a wired connection; however, the transfer could occur through a wireless connection.

Media player 114 causes the content to be played on display 115. In one embodiment, the content is HDMI content and media player 114 transfer the media content to display via a wired connection; however, the transfer could occur through a wireless connection. Display 115 may comprise a plasma display, an LCD, a CRT, etc.

Note that the system in FIG. 1 may be altered to include a DVD player/recorder in place of a DVD player/recorder to receive, and play and/or record the content.

Figure 3:
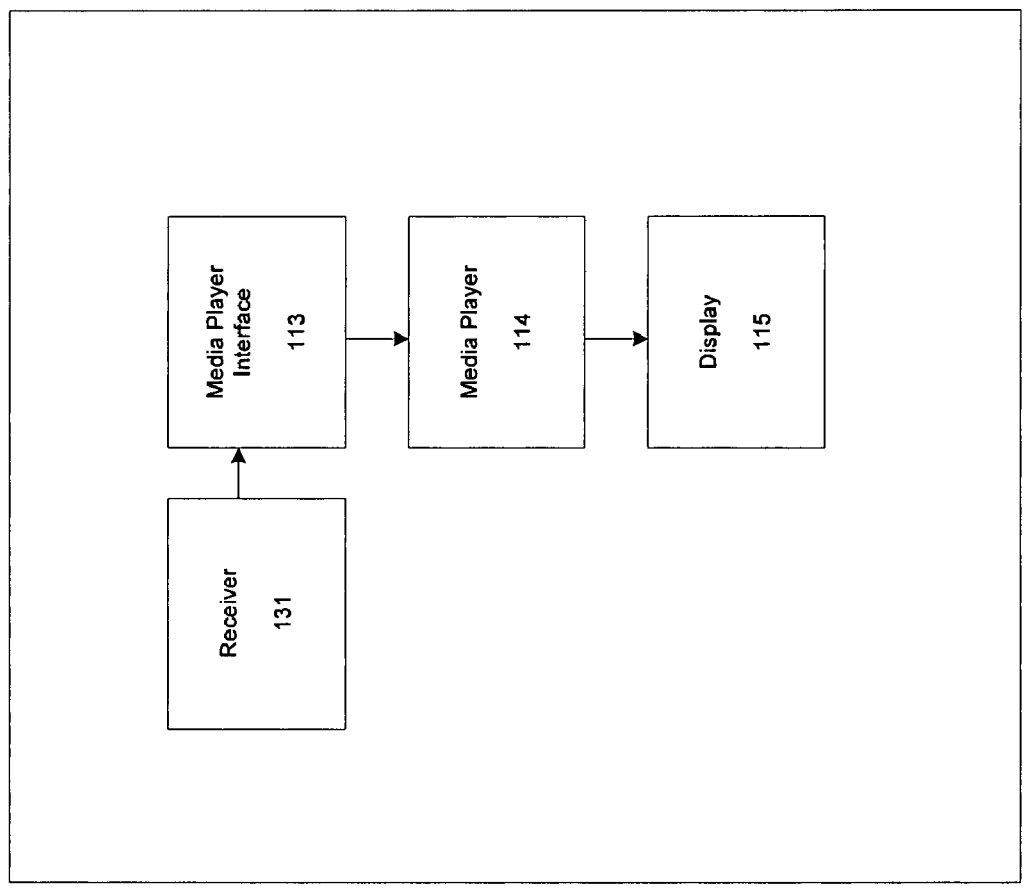
FIG. 3 is a block diagram of one embodiment of a peripheral device.

In one embodiment, transmitter 140 and media receiver interface 102 are part of media receiver 100. Similarly, in one embodiment, receiver 140, media player interface 113, and media player 114 are all part of the same device. In an alternative embodiment, receiver 140, media player interface 113, media player 114, and display 115 are all part of the display. An example of such a device is shown in FIG. 3.

In one embodiment, transmitter device 140 comprises a processor 103, an optional baseband processing component 104, a phased array antenna 105, and a wireless communication channel interface 106. Phased array antenna 105 comprises a radio frequency (RF) transmitter having a digitally controlled phased array antenna coupled to and controlled by processor 103 to transmit content to receiver device 141 using adaptive beamforming.

In one embodiment, receiver device 141 comprises a processor 112, an optional baseband processing component 111, a phased array antenna 110, and a wireless communication channel interface 109. Phased array antenna 110 comprises a radio frequency (RF) transmitter having a digitally controlled phased array antenna coupled to and controlled by processor 112 to receive content from transmitter device 140 using adaptive beamforming.

In one embodiment, processor 103 generates baseband signals that are processed by baseband signal processing 104 prior to being wirelessly transmitted by phased array antenna 105. In such a case, receiver device 141 includes baseband signal processing to convert analog signals received by phased array antenna 110 into baseband signals for processing by processor 112. In one embodiment, the baseband signals are orthogonal frequency division multiplex (OFDM) signals. In one embodiment, the baseband signals are single carrier phase, amplitude, or both phase and amplitude modulated signals.

In one embodiment, transmitter device 140 and/or receiver device 141 are part of separate transceivers.

Transmitter device 140 and receiver device 141 perform wireless communication using phased array antenna with adaptive beamforming that allows beam steering. Beamforming is well known in the art. In one embodiment, processor 103 sends digital control information to phased array antenna 105 to indicate an amount to shift one or more phase shifters in phased array antenna 105 to steer a beam formed thereby in a manner well-known in the art. Processor 112 uses digital control information as well to control phased array antenna 110. The digital control information is sent using control channel 121 in transmitter device 140 and control channel 122 in receiver device 141. In one embodiment, the digital control information comprises a set of coefficients. In one embodiment, each of processors 103 and 112 comprises a digital signal processor.

Wireless communication link interface 106 is coupled to processor 103 and provides an interface between wireless communication link 107 and processor 103 to communicate antenna information relating to the use of the phased array antenna and to communicate information to facilitate playing the content at another location. In one embodiment, the information transferred between transmitter device 140 and receiver device 141 to facilitate playing the content includes encryption keys sent from processor 103 to processor 112 of receiver device 141 and one or more acknowledgments from processor 112 of receiver device 141 to processor 103 of transmitter device 140.

Wireless communication link 107 also transfers antenna information between transmitter device 140 and receiver device 141. During initialization of the phased array antennas 105 and 110, wireless communication link 107 transfers information to enable processor 103 to select a direction for the phased array antenna 105. In one embodiment, the information includes, but is not limited to, antenna location information and performance information corresponding to the antenna location, such as one or more pairs of data that include the position of phased array antenna 110 and the signal strength of the channel for that antenna position. In another embodiment, the information includes, but is not limited to, information sent by processor 112 to processor 103 to enable processor 103 to determine which portions of phased array antenna 105 to use to transfer content.

When the phased array antennas 105 and 110 are operating in a mode during which they may transfer content (e.g., HDMI content), wireless communication link 107 transfers an indication of the status of communication path from the processor 112 of receiver device 141. The indication of the status of communication comprises an indication from processor 112 that prompts processor 103 to steer the beam in another direction (e.g., to another channel). Such prompting may occur in response to interference with transmission of portions of the content. The information may specify one or more alternative channels that processor 103 may use.

In one embodiment, the antenna information comprises information sent by processor 112 to specify a location to which receiver device 141 is to direct phased array antenna 110. This may be useful during initialization when transmitter device 140 is telling receiver device 141 where to position its antenna so that signal quality measurements can be made to identify the best channels. The position specified may be an exact location or may be a relative location such as, for example, the next location in a predetermined location order being followed by transmitter device 140 and receiver device 141.

In one embodiment, wireless communications link 107 transfers information from receiver device 141 to transmitter device 140 specifying antenna characteristics of phased array antenna 110, or vice versa.

An Example of a Transceiver Architecture

Figure 2:
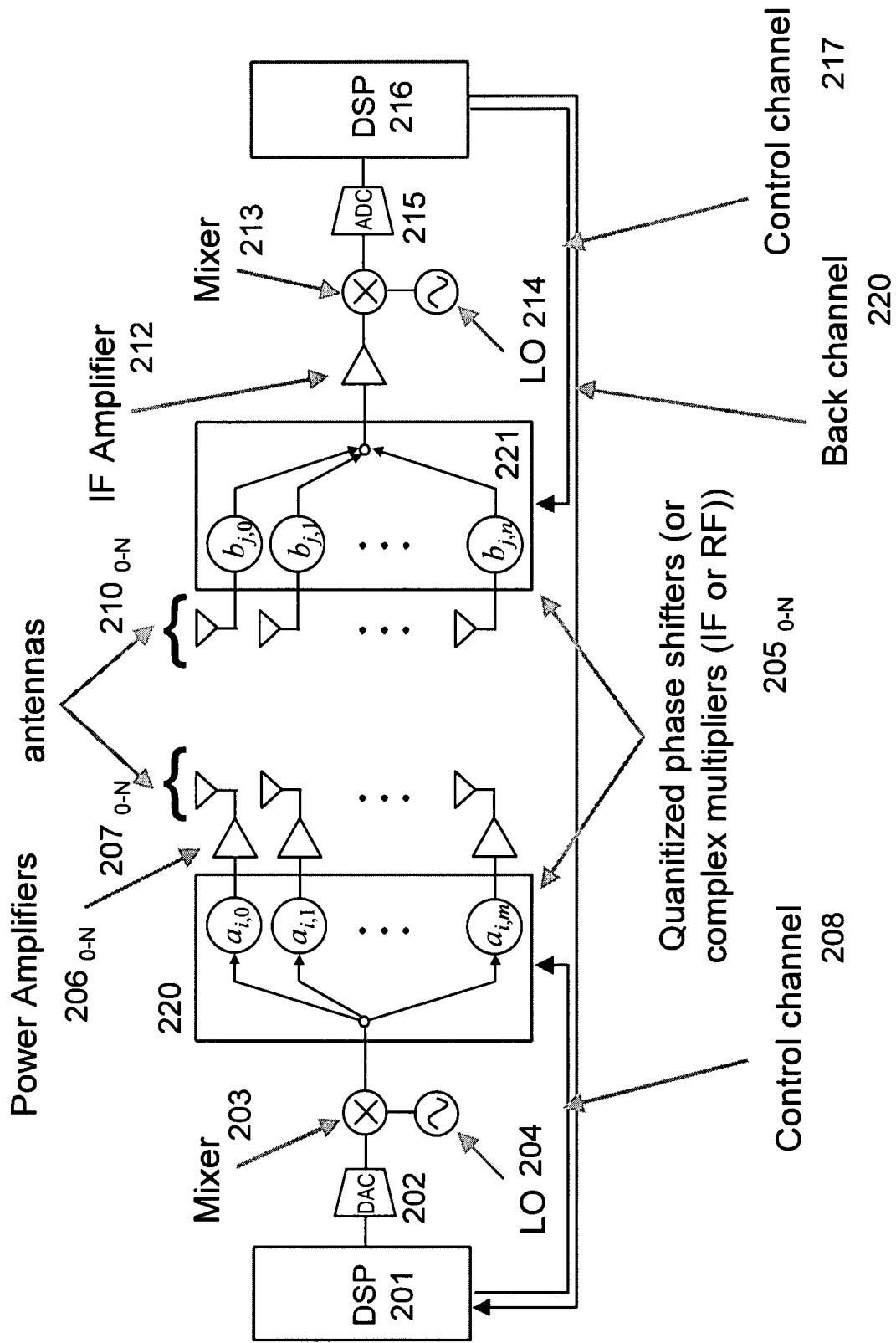
FIG. 2 is a more detailed block diagram of one embodiment of the communication system.

FIG. 2 is a block diagram of one embodiment of an adaptive beam forming multiple antenna radio system containing transmitter device 140 and receiver device 141 of FIG. 1. Transceiver 200 includes multiple independent transmit and receive chains. Transceiver 200 performs phased array beam forming using a phased array that takes an identical RF signal and shifts the phase for one or more antenna elements in the array to achieve beam steering.

Referring to FIG. 2, Digital Signal Processor (DSP) 201 formats the content and generates real time baseband signals. DSP 201 may provide modulation, FEC coding, packet assembly, interleaving and automatic gain control.

DSP 201 then forwards the baseband signals to be modulated and sent out on the RF portion of the transmitter. In one embodiment, the content is modulated into OFDM signals in a manner well known in the art.

Digital-to-analog converter (DAC) 202 receives the digital signals output from DSP 201 and converts them to analog signals. In one embodiment, the signals output from DAC 202 are between 0-256 MHz signals. In an alternative embodiment, the signals output from DAC 202 are between 0-750 MHz signals.

Mixer 203 receives signals output from DAC 202 and combines them with a signal from a local oscillator (LO) 204. The signals output from mixer 203 are at an intermediate frequency. In one embodiment, the intermediate frequency is between 2-15 GHz.

Multiple phase shifters $205_{0-N}$ receive the output from mixer 203. A demultiplier is included to control which phase shifters receive the signals. In one embodiment, these phase shifters are quantized phase shifters. In an alternative embodiment, the phase shifters may be replaced by complex multipliers. In one embodiment, DSP 201 also controls, via control channel 208, the phase and magnitude of the currents in each of the antenna elements in phased array antenna 220 to produce a desired beam pattern in a manner well-known in the art. In other words, DSP 201 controls the phase shifters $205_{0-N}$ of phased array antenna 220 to produce the desired pattern.

Each of phase shifters $205_{0-N}$ produce an output that is sent to one of power amplifiers $206_{0-N}$, which amplify the signal. The amplified signals are sent to antenna array 207 which has multiple antenna elements $207_{0-N}$. In one embodiment, the signals transmitted from antennas $207_{0-N}$ are radio frequency signals between 56-64 GHz. Thus, multiple beams are output from phased array antenna 220.

With respect to the receiver, antennas $210_{0-N}$ receive the wireless transmissions from antennas $207_{0-N}$ and provide them to phase shifters $211_{0-N}$. As discussed above, in one embodiment, phase shifters $211_{0-N}$ comprise quantized phase shifters. Alternatively, phase shifters $211_{0-N}$ may be replaced by complex multipliers. Phase shifters $210_{0-N}$ receive the signals from antennas $210_{0-N}$, which are combined to form a single line feed output. In one embodiment, a multiplexer is used to combine the signals from the different elements and output the single feed line. The output of phase shifters $211_{0-N}$ is input to intermediate frequency (IF) amplifier 212, which reduces the frequency of the signal to an intermediate frequency. In one embodiment, the intermediate frequency is between 2-9 GHz.

Mixer 213 receives the output of the IF amplifier 212 and combines it with a signal from LO 214 in a manner well-known in the art. In one embodiment, the output of mixer 213 is a signal in the range of 0 to about 250 MHz. In one embodiment, there are I and Q signals for each channel. In an alternative embodiment, the output of mixer 213 is a signal in the range of 0 to about 750 MHz.

Analog-to-digital converter (ADC) 215 receives the output of mixer 213 and converts it to digital form. The digital output from ADC 215 is received by DSP 216. DSP 216 restores the amplitude and phase of the signal. DSPs 211 may provide demodulation, packet disassembly, de-interleaving, FEC decoding, and automatic gain control.

In one embodiment, each of the transceivers includes a controlling microprocessor that sets up control information for DSP. The controlling microprocessor may be on the same die as the DSP.

The Back Channel

In one embodiment, the wireless communication system includes a back channel, or link, for transmitting information between wireless communication devices (e.g., a transmitter and receiver, a pair of transceivers, etc.). The information is related to the beamforming antennas and enables one or both of the wireless communication devices to adapt the array of antenna elements to better direct the antenna elements of a transmitter to the antenna elements of the receiving device together. The information also includes information to facilitate the use of the content being wirelessly transferred between the antenna elements of the transmitter and the receiver.

In FIG. 2, back channel 220 is coupled between DSP 216 and DSP 201 to enable DSP 216 to send tracking and control information to DSP 201. In one embodiment, back channel 220 functions as a high speed downlink and an acknowledgement channel.

In one embodiment, the back channel is also used to transfer information corresponding to the application for which the wireless communication is occurring (e.g., wireless video). Such information includes content protection information. For example, in one embodiment, the back channel is used to transfer encryption information (e.g., encryption keys and acknowledgements of encryption keys) when the transceivers are transferring HDMI data. In such a case, the back channel is used for content protection communications.

More specifically, in HDMI, encryption is used to validate that the data sink is a permitted device (e.g., a permitted display). There is a continuous stream of new encryption keys that is transferred while transferring the HDMI data stream to validate that the permitted device has not been changed. Blocks of frames for the HD TV data are encrypted with different keys and then those keys have to be acknowledged back on back channel 220 in order to validate the player. Back channel 220 transfers the encryption keys in the forward direction to the receiver and acknowledgements of key receipts from the receiver in the return direction. Thus, encrypted information is sent in both directions.

The use of the back channel for content protection communications is beneficial because it avoids having to complete a lengthy retraining process when such communications are sent along with content. For example, if a key from a transmitter is sent alongside the content flowing across the primary link and that primary link breaks, it will force a lengthy retrain of 2-3 seconds for a typical HDMI/HDCP system. In one embodiment, this separate bi-directional link that has higher reliability than the primary directional link given its omni-directional orientation. By using this back channel for communication of the HDCP keys and the appropriate acknowledgement back from the receiving device, the time consuming retraining can be avoided even in the event of the most impactful obstruction.

During the active period when the beamforming antennas are transferring content, the back channel is used to allow the receiver to notify the transmitter about the status of the channel. For example, while the channel between the beamforming antennas is of sufficient quality, the receiver sends information over the back channel to indicate that the channel is acceptable. The back channel may also be used by the receiver to send the transmitter quantifiable information indicating the quality of the channel being used. If some form of interference (e.g., an obstruction) occurs that degrades the quality of the channel below an acceptable level or prevents transmissions completely between the beamforming antennas, the receiver can indicate that the channel is no longer acceptable and/or can request a change in the channel over the back channel. The receiver may request a change to the next channel in a predetermined set of channels or may specify a specific channel for the transmitter to use.

In one embodiment, the back channel is bidirectional. In such a case, in one embodiment, the transmitter uses the back channel to send information to the receiver. Such information may include information that instructs the receiver to position its antenna elements at different fixed locations that the transmitter would scan during initialization. The transmitter may specify this by specifically designating the location or by indicating that the receiver should proceed to the next location designated in a predetermined order or list through which both the transmitter and receiver are proceeding.

In one embodiment, the back channel is used by either or both of the transmitter and the receiver to notify the other of specific antenna characterization information. For example, the antenna characterization information may specify that the antenna is capable of a resolution down to 6 degrees of radius and that the antenna has a certain number of elements (e.g., 32 elements, 64 elements, etc.).

In one embodiment, communication on the back channel is performed wirelessly by using interface units. Any form of wireless communication may be used. In one embodiment, OFDM is used to transfer information over the back channel. In another embodiment, continuous-phase modulation (CPM) with low peak-to-average power ratio is used to transfer information over the back channel.

Reduction of Power Consumption

In order to sustain very high data rates and low costs, a wireless device may have multiple antennas that are adjusted in phase and amplitude to focus the radio waves in a direction that maximizes the useful power delivered to the receiver. However, for low power devices operating at reduced ranges and/or reduced data rates, using all of the power amplifiers in the transmitter to excite all of the antennas will be wasteful of power. In accordance with one embodiment, only a portion of the antennas are used in the low-range situation and the power amplifiers associated with the unused antennas are turned off to reduce the TX power usage. This reduces the range somewhat, but at a great savings in power. For example, if only one-half of the antennas are used, and hence one-half of the power, the range is decreased by a factor of four. In accordance with another embodiment, only a portion of the antennas are turned off to reduce RX power usage. A wireless device may include several antennas coupled to a receiver, a transmitter, or both.

Figure 4:
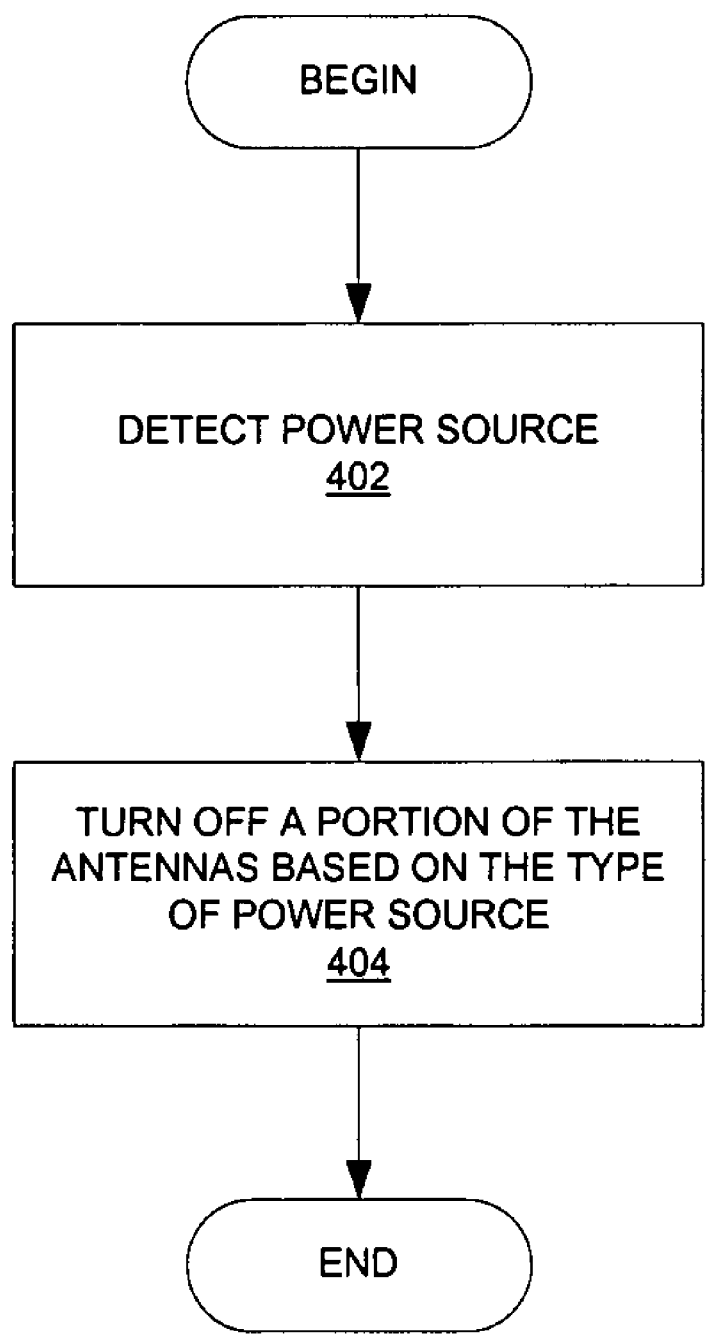
FIG. 4 is a flow diagram of one embodiment of a method for reducing a power consumption of a wireless device using a portion of the antennas of the wireless device based on the power source of the wireless device.

FIG. 4 is a flow diagram of one embodiment of a method for reducing a power consumption of a wireless device using a portion of the antennas of the wireless device based on the power source of the wireless device. At 402, the type of power source of the wireless device is determined. For example, the wireless device may detected whether it is powered by a battery or an AC power supply. At 404, once the device detects if it is battery or AC mains powered, it automatically reduces the number of TX antennas that are used to minimize power usage. The wireless device can operate with all the antennas and power amplifiers when it is powered by the AC mains.

Figure 5:
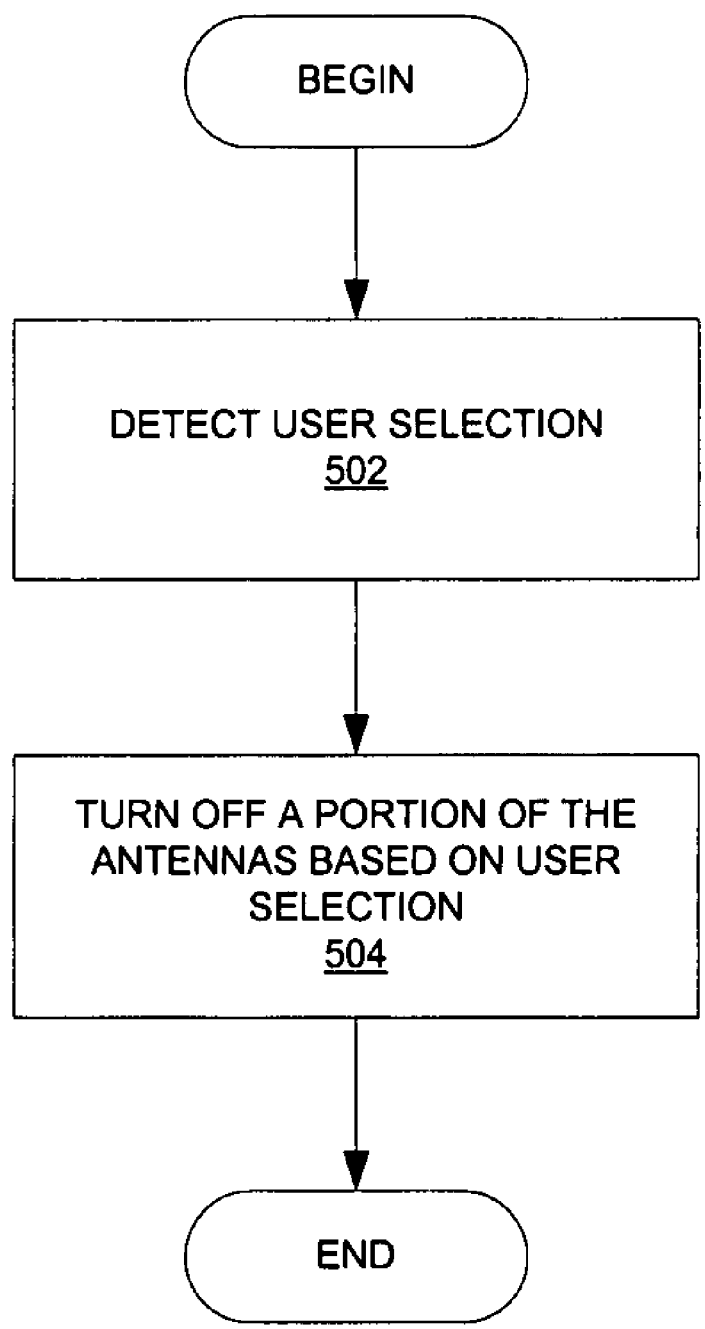
FIG. 5 is a flow diagram of one embodiment of a method for reducing a power consumption of a wireless device using a portion of the antennas of the wireless device based on a user selection.

FIG. 5 is a flow diagram of one embodiment of a method for reducing a power consumption of a wireless device using a portion of the antennas of the wireless device based on a user selection. If a user is charging the battery of the wireless device or if the user wants to run the wireless device for longer than is typical, they may want to set it near a power outlet, which may or may not be close to the display. In this case, the user can tell the device to go to full power, thereby using all of the antennas for transmitting the data, allowing the connection over a longer distance. At 502, a user selection is determined. At 504, the number of antennas used to transmit or receive is based on the user selection.

Figure 6:
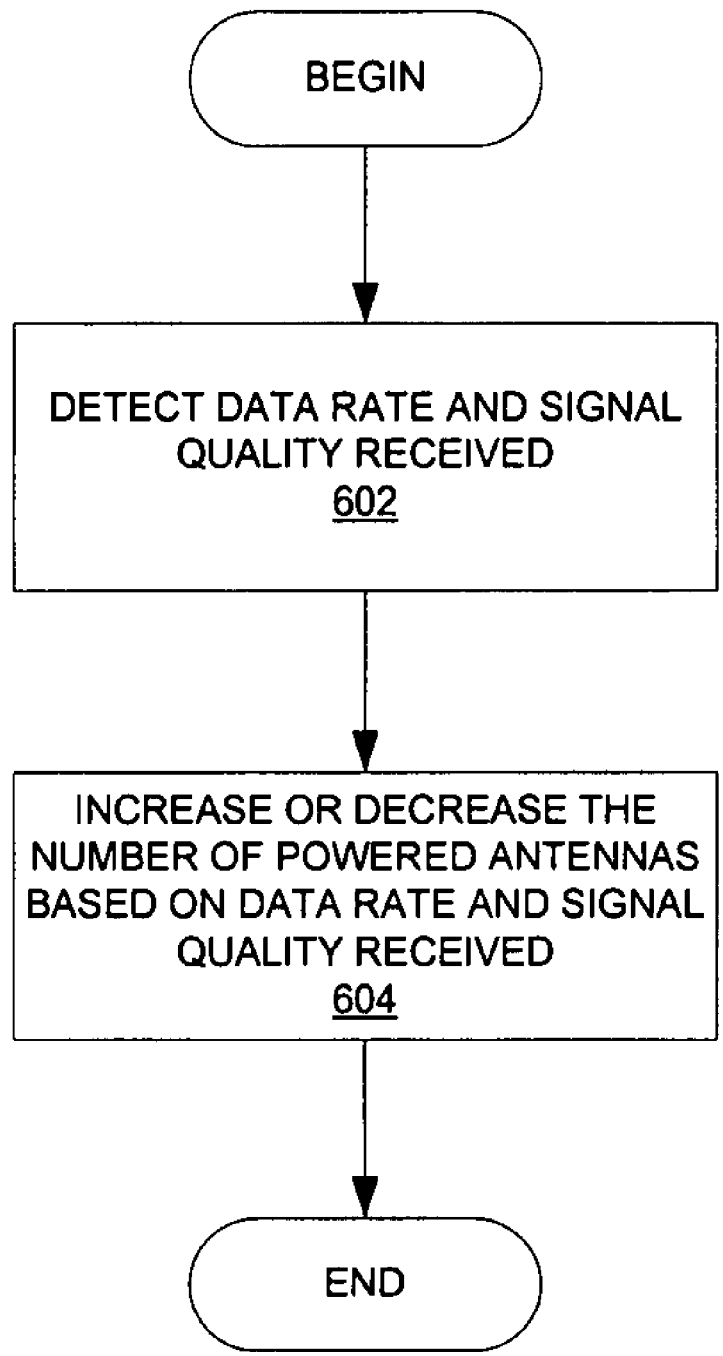
FIG. 6 is a flow diagram of one embodiment of a method for reducing a power consumption of a wireless device using a portion of the antennas of the wireless device based on a received data rate and signal quality.
Figure 7:
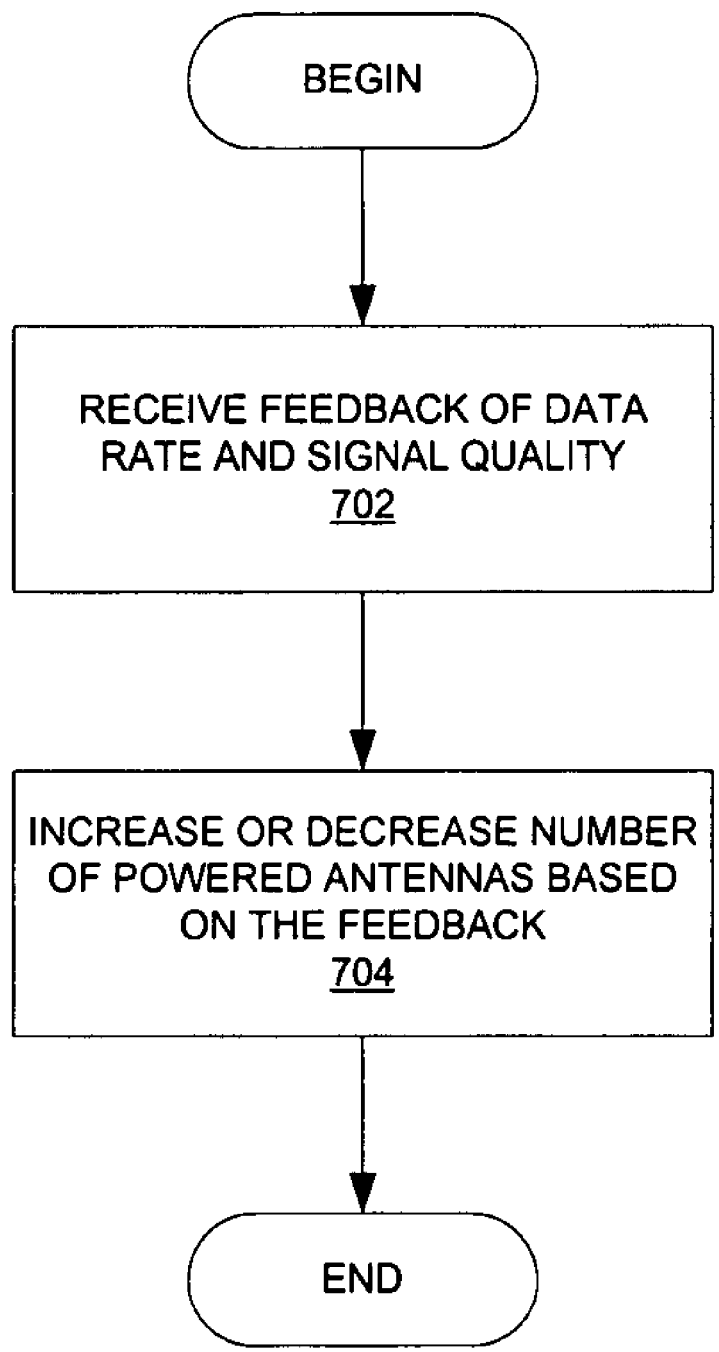
FIG. 7 is a flow diagram of one embodiment of a method for reducing a power consumption of a wireless device using a portion of the antennas of the wireless device based on a feedback of data rate and signal quality.

In another embodiment, the wireless device decreases the number of antennas used while maintaining the data rate and a desired signal quality as illustrated in FIGS. 6 and 7.

FIG. 6 is a flow diagram of one embodiment of a method for reducing a power consumption of a wireless device using a portion of the antennas of the wireless device based on a received data rate and signal quality. At 602, the wireless device may monitor the data rate and signal quality of data received. At 604, if the quality of the signal or the data rate is below a predetermined or preset threshold, more antennas in the receiving wireless device may be used.

FIG. 7 is a flow diagram of one embodiment of a method for reducing a power consumption of a wireless device using a portion of the antennas of the wireless device based on a feedback of data rate and signal quality. At 702, the wireless device may receive a feedback of data rate and signal quality received at another wireless device at another location. At 704, if the quality of the feedback signal or the data rate is below a predetermined or preset threshold, more antennas in the transmitting wireless device may be used. In accordance with one embodiment, the wireless device monitors the channel conditions and changes the number of TX antennas used on a continual, automatic basis to optimize parameters such as power usage, performance, resistance to interference, and/or performance per amount of power used. As the link quality is reduced, the wireless device may utilize more TX antennas for the link and as the link quality improves it may decrease the number of TX antennas used. Thus in the case where the source device is close to the display and has an unimpeded line of sight link, the battery drain is minimized. At the same time, if the link is temporarily blocked, the device can temporarily increase the number of TX antennas that are used to maintain the link quality at the expense of a temporary increase in the power used. This automatic adjustment of power provides optimal use of the finite energy available in the battery.

Figure 8:
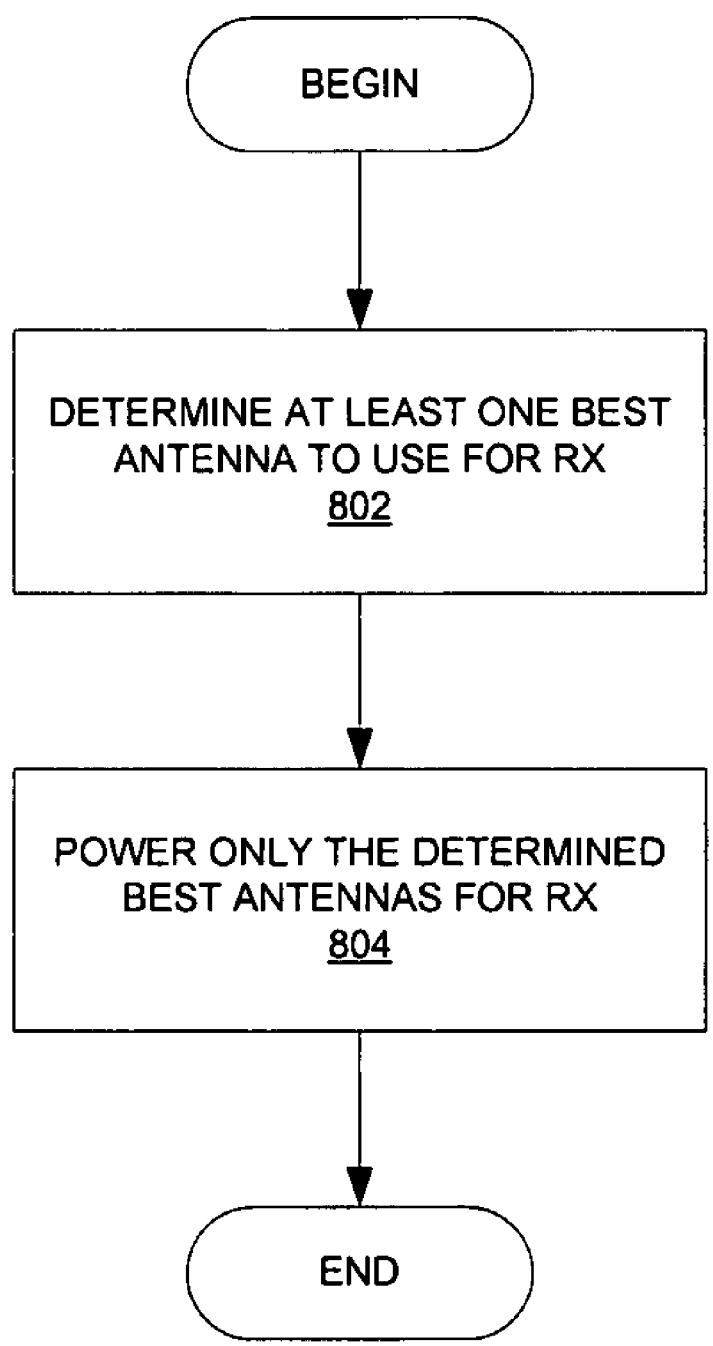
FIG. 8 is a flow diagram of one embodiment of a method for reducing a power consumption of a wireless device using specific antennas of the wireless device based on a received data rate and signal quality.
Figure 9:
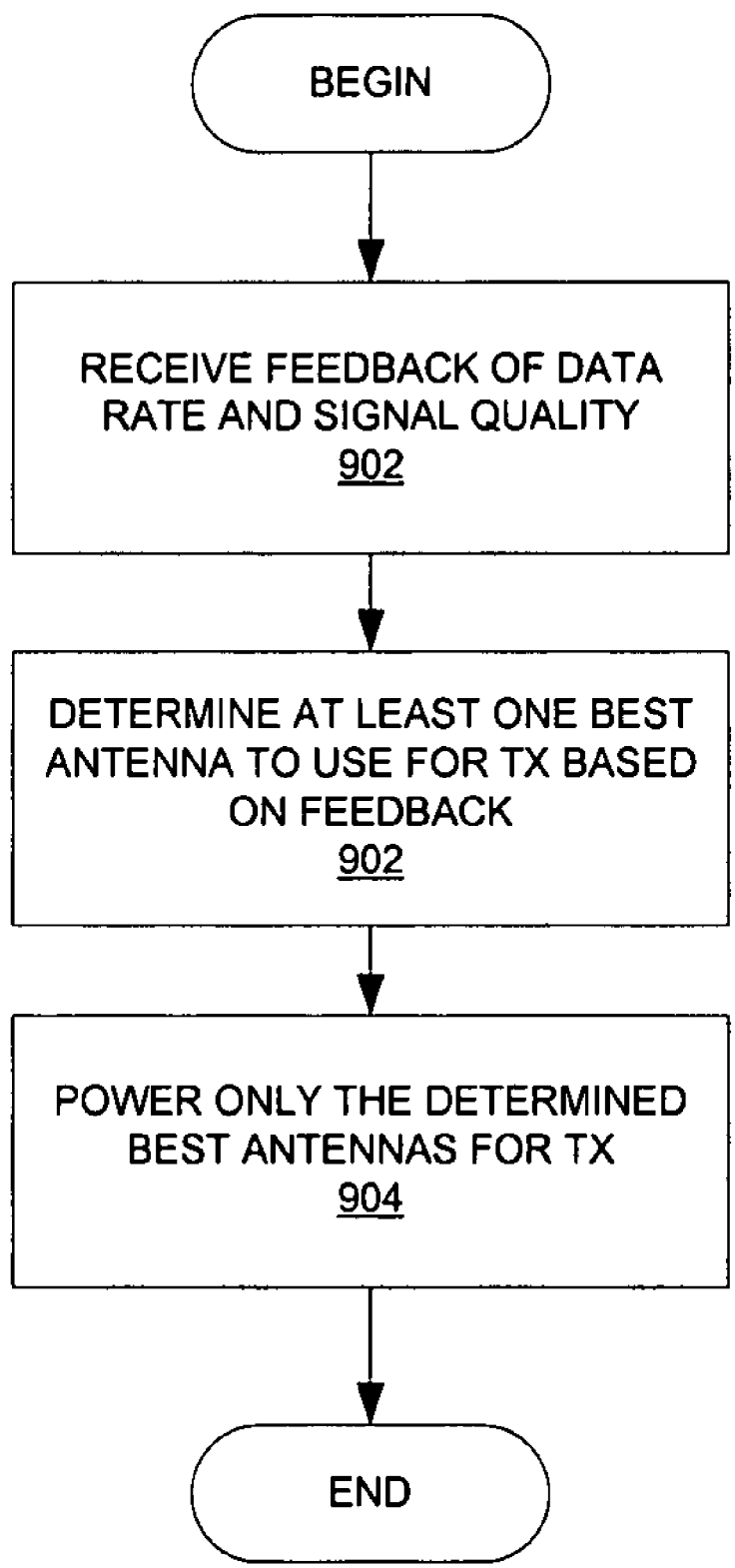
FIG. 9 is a flow diagram of one embodiment of a method for reducing a power consumption of a wireless device using specific antennas of the wireless device based on a feedback of data rate and signal quality.

In another embodiment, the wireless device may select specific antennas to be powered and specific antennas to be turned off, as illustrated in FIGS. 8 and 9.

FIG. 8 is a flow diagram of one embodiment of a method for reducing a power consumption of a wireless device using specific antennas of the wireless device based on a received data rate and signal quality. At 802, the data rate and signal quality is determined and monitored. At 804, each antenna is evaluated to determine whether to power it on or off in response to an increase or decrease in the data rate and signal quality received at the wireless device.

FIG. 9 is a flow diagram of one embodiment of a method for reducing a power consumption of a wireless device using specific antennas of the wireless device based on a feedback of data rate and signal quality. At 902, a feedback of the data rate and signal quality received at another wireless device at another location is received and monitored. At 904, each antenna is evaluated to determine whether to power it on or off in response to an increase or decrease in the data rate and signal quality of the feedback. The wireless device may determine which TX antennas are capable of sending the highest performance or lowest power-consuming signals. This is important because the effective transmit performance of antennas may vary depending on the relative position of the antenna, environmental, and/or manufacturing factors. The wireless device would then select exactly which would be the best antennas to use (adjusting the selection from time to time) so as to optimize the aforementioned parameters. This antenna selection can be done based on the estimated channel between the transmit antenna and the desired receiver. One example would be to use only the antennas that give the strongest received signal.

In accordance with another embodiment, the wireless device may use a narrower signal bandwidth for the reduced data rate to reduce power usage. The wireless device may reduce the data rate and the TX RF power by transmitting only those sub-carriers that have the best link quality, or send a portion of the original image or video stream as illustrated in FIGS. 10, 11, and 12.

Figure 10:
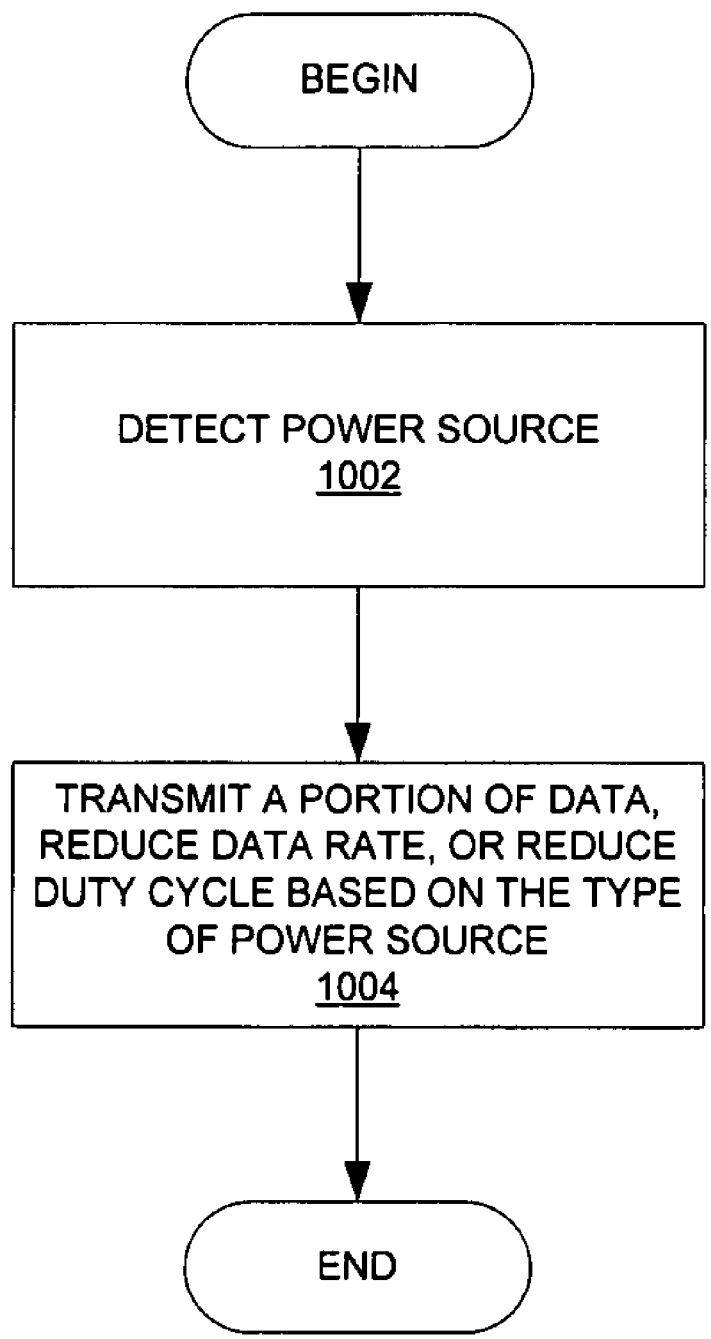
FIG. 10 is a flow diagram of another embodiment of a method for reducing a power consumption of a wireless device using data rate reduction, or partial transmission of the data, based on the power source of the wireless device.

FIG. 10 is a flow diagram of another embodiment of a method for reducing a power consumption of a wireless device based on the power source of the wireless device. At 1002, a power source of the wireless device is determined. Based on the type of power source, the wireless device may transmit a portion of the data, may reduce the data rate, or may reduce a duty cycle at 1004.

Figure 11:
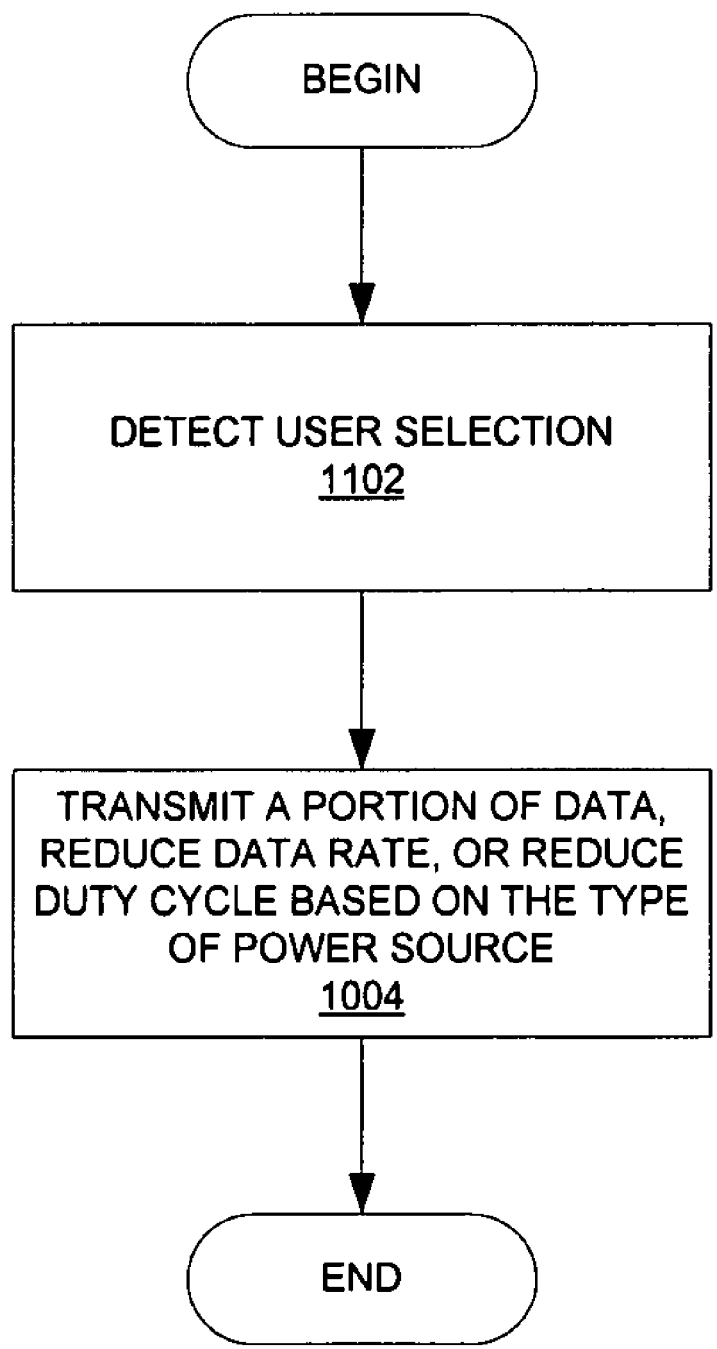
FIG. 11 is a flow diagram of another embodiment of a method for reducing a power consumption of a wireless device using data rate reduction, or partial transmission of the data, based on a user selection.

FIG. 11 is a flow diagram of another embodiment of a method for reducing a power consumption of a wireless device based on a user selection. At 1102, a user power selection of the wireless device is determined. Based on the user selection, the wireless device may transmit a portion of the data, may reduce the data rate, or may reduce a duty cycle at 1104.

Figure 12:
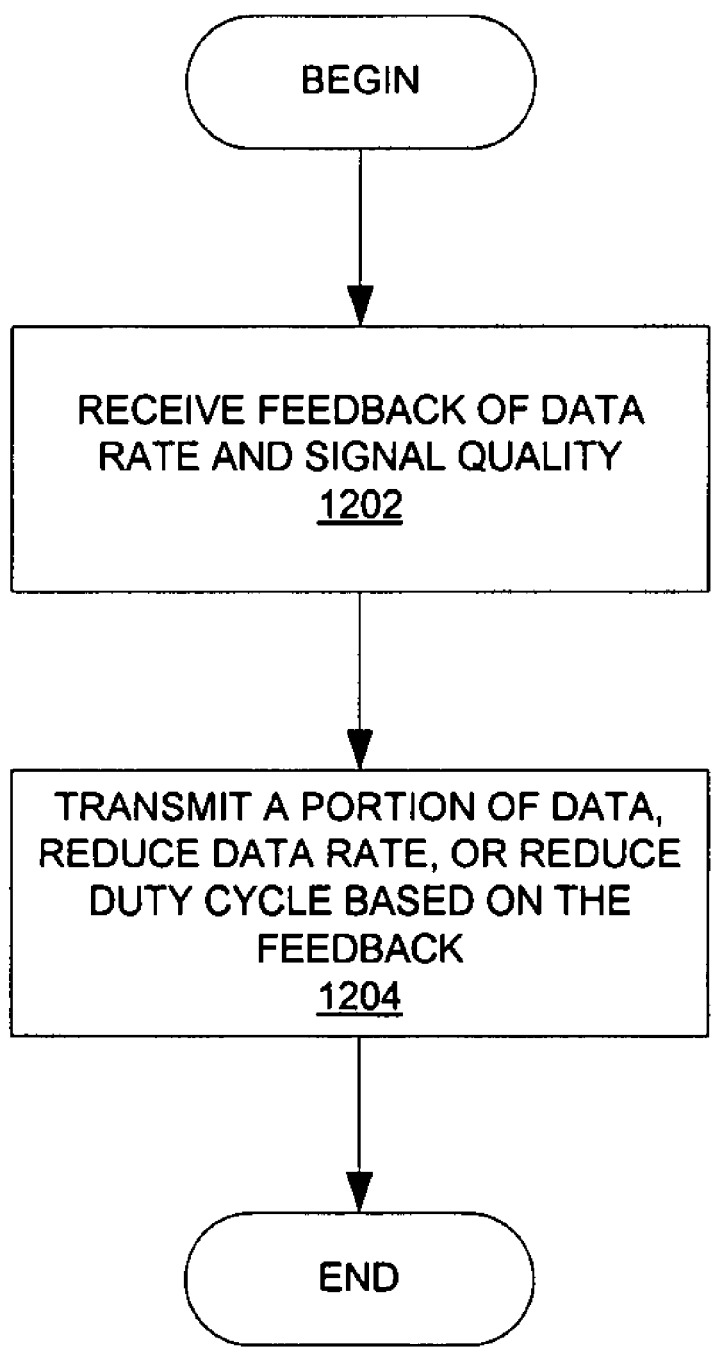
FIG. 12 is a flow diagram of another embodiment of a method for reducing a power consumption of a wireless device using data rate reduction, or partial transmission of the data, based on a feedback of data rate and signal quality.

FIG. 12 is a flow diagram of another embodiment of a method for reducing a power consumption of a wireless device based on a feedback of data rate and signal quality. At 1202, a feedback of data rate and signal quality received at another wireless device at another location is determined. Based on the feedback, the wireless device may transmit a portion of the data, may reduce the data rate, or may reduce a duty cycle at 1204.

Such portions could include skipping entire lines, specific pixels, patterns of pixels, subsets of pixels and or a subset of the bits per pixel. The pattern used or bits used can be selected differently on the chrominance or luminance or the physical location of the pixels in the displayed image.

In an uncompressed video signal, most of the information is contained in the most significant bits (msbs) of each of the three color signals. Much of the signal fidelity can be reconstructed by sending only a portion of the bits used to encode the color for each of the pixels. For example, if only the 2 most significant bits of each byte for the three colors of the image are sent, the data rate is reduced by a factor of four. At the receiving end, a variety of algorithms can be used to reconstruct the image. The missing least significant bits (lsbs) could be filled with random data to avoid creating artifacts in the image. Alternately, each the missing lsbs could be determined from the msbs that are sent. In another embodiment, the msbs from one or more adjacent pixels can be used with the msbs of the pixel to calculate the lsbs required to complete the pixel data.

Once the data rate has been reduced, the device can then transmit for less time overall, reducing the average power usage. Alternately, the device could reduce both the RF transmit (TX) power and the data rate to reduce both the average and peak power usage in the device. Because the data rate is reduced along with the RF TX power, the link margin can remain the same while reducing the energy and power required from the battery.

The highest quality HD signals, currently 1080p, operate in progressive scan mode. What that means is that the entire video frame is sent at the frame rate, which is approximately 30 Hz (Other rates are supported, including 24 Hz, and for lower resolutions, 60 Hz. In addition, rates of 24 Hz/1.001, 30 Hz/1.001 and 60 Hz/1.001 are defined from some resolutions.) A lower quality version at the same resolution, 1080i, operates at half of the data rate of 1080p. It does this by sending alternate lines of the video frames at the same frame rate. Thus the data on the screen is updated at the same rate, but only ½ the data at a given time. For example, a 1080i video stream might would send the odd lines from one video frame and the even lines from the next one, alternating odd and even at the 30 Hz update rate.

For the mobile device transmitting video content, it can save power by taking progressive scan stream and converting it to interlaced by dropping one half of the video lines at the transmitter. At the receiver, the previous video frame, only one-half the size of a full progressive frame because it is the interlaced version, is stored. The receiver then provides as output the previous frame with the current frame as a complete video frame. In one embodiment, the transmitting system sends the data at the higher data rate, but uses one-half the time, reducing the average power required from the battery by about one-half. In another embodiment, the transmitting system reduces both the RF TX power and data rate by one-half, reducing both the peak power and the average power required from the battery. In a further embodiment, either of these power reduction techniques can be applied in a system that senses when the transmitter is plugged in or operating off of the battery and adjusts the parameters to save power, either due to user intervention or automatically based on the state of the input power.

Another embodiment either transmits at a reduced duty cycle or reduces the power and data rate automatically in response to changing channel conditions and power source. When the device is plugged in, it operates at the full data rate. When the device in battery powered and is experiencing good wireless link conditions, it operates with either reduced duty cycle or reduced RF TX power and data rate. If the wireless link conditions are poor, the device either temporarily increases the RF TX power or repeats lost radio transmissions to improve the reliability of the data delivery.

In another embodiment, the device signals to the display to operate at a lower resolution, frame rate, color depth, or fidelity so as to reduce the amount of data that it expects the device to send; thereby, reducing power consumption.

In a further embodiment that applies to all of the previous ones, the receiver applies one of the many de-interlacing, concealment, and/or transcoding algorithms to reduce the visual effect of the artifacts created by changing from progressive scan to interlaced scan.

In the case where the mobile wireless device needs to display an image, for example a DSC wirelessly presenting images on a display, the refresh rate can be very slow, on the order a few times a second (<6 Hz) because display is not showing motion. In this case, the transmitting device will reduce the refresh rate from 24, 30 or 60 Hz to a much lower rate, e.g., 3 or 6 Hz, providing a potential power savings of 10 to 20 times. The receiver then stores the video frame in memory and then provides it to the output at the desired refresh rate by simply repeating the same data. In one embodiment, the transmitter reduces the duty cycle for sending data, but using the higher data rate. This allows the transmitter to be active only a portion of the time, reducing the average power required from the battery. In another embodiment, the transmitter reduces both the RF TX power and the data rate, thereby reducing both the peak and average power required from the battery. In another embodiment, the device can use the method of reduced refresh rate for still images, either reduced duty cycle or reduced RF TX power and data rate, depending on the state of the power source for the device, either by user intervention or by automatically selecting the method by sensing the power source.

Another embodiment of this invention is one in which the transmitter sends subset of the pixels only and the receiver reconstructs the signal before passing it to the display. In another embodiment the receiver applies one of the many de-interlacing, concealment, and/or transcoding algorithms to reduce the visual effect of the artifacts created by send a reduced number of the pixels. One such arrangement could be a "checkerboard" in which every other pixel is sent with the first pixel that is not sent is either the first or second pixel, alternating between lines, e.g., line 1, 3, 5, . . . skip odd numbered pixels, lines 2, 4.6 . . . skip even numbered pixels.

The pixels around the edge of the screen are often viewed only by a person's peripheral vision and so they could be skipped and replaced with random data. Also, the content is typically focused to place the most important part of the image at the center, so pixels around the outer edge could be skipped or sent with less resolution, reducing the required bandwidth. In one embodiment, a subset of the pixels in the video frame or image that are on the outer periphery of the frame or image are not sent or are sent with lower resolution.

In a further embodiment that applies to all of the previous ones, the receiver applies one of the many de-interlacing, concealment, and/or transcoding algorithms to reduce the visual effect of the artifacts created either sending fewer pixels or fewer bits for any of the pixels.

For all of the previously recited methods, the system may use a narrower signal bandwidth for the reduced data rate to reduce power usage. For example, this can reduce the power required for the various parts of the radio, e.g., ADC, DAC, analog baseband, digital baseband and power amplifiers.

For all of the previously recited methods, the system may reduce the data rate and TX RF power by transmitting only those sub-carriers that have the best link quality.

In accordance with another embodiment, the wireless device may operate by alternating data processing and radio transmission. For the mobile device, the battery life is determined not just by the power used by the wireless connection, but also by the power used in the rest of the system. For example, a DVC needs to provide power to read the tape. In all of these devices, the output is uncompressed video because most displays do not have decompression capability and if they do, they may not have the correct decoder for the format of the data on the device. Thus for maximum compatibility, the video or still image is decompressed and reformatted prior to being sent to the display. This decompression can use a significant amount of power and if the decompression runs at the same time as radio is transmitting, then the overall peak power is increased. A battery, in addition to having a finite amount of energy, also has a finite power that can be delivered due to the characteristics of the battery. If the combination of the power required to decompress the data plus the power required for transmitting the data exceeds the power limit for the battery, then the system will not work. In addition, all batteries have an internal resistance and the power lost (and converted to heat) is proportional to the square of the current. Thus if the current can be cut in half, the power lost due to the internal resistance of the battery would be reduced by one-quarter.

With high radio data rates available and lower application data rates, it is possible to schedule the decompression and other processes to occur only when the radio isn't transmitting. Likewise, when the device is decompressing the data, the transmitter in not operating, so that the peak power required is reduced. In one embodiment, the radio provides a signal to the device that indicates when the radio is transmitting. When the device receives this signal, it postpones power intensive tasks until the radio signals that it is either idle or in receive mode. This scheduling allows the device to reduce the peak power required for the application. For all of the previously recited embodiments, a system in which any processing including video or image processing is scheduled to occur when the radio is not transmitting or receiving.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus comprising:
   a processor; and
   a radio frequency (RF) transmitter having a plurality of digitally controlled phased array antennas coupled to and controlled by the processor to transmit data,
   wherein the processor is to enable one or more antennas to be turned off during a use of the apparatus to reduce power consumption of the apparatus, the one or more antennas turned off based on at least one of i) a data rate at the apparatus being above a first predetermined threshold and a signal quality of data at the apparatus being above a second predetermined threshold, and ii) a feedback of a data rate at another location being above a third threshold and a signal quality at a device at another location being above a fourth predetermined threshold.

2. The apparatus of claim 1 further comprising a plurality of power amplifiers corresponding to the plurality of digitally controlled phased array antennas.

3. The apparatus of claim 2 wherein the processor is to turn off a power amplifier associated with an antenna to be turned off.

4. The apparatus of claim 1 wherein one or more antennas are turned off when the power source of the apparatus is a battery.

5. The apparatus of claim 1 wherein all antennas are turned on when the power source of the apparatus is an AC power supply.

6. An apparatus comprising:
   a processor; and
   a radio frequency (RF) transmitter having a plurality of digitally controlled phased array antennas coupled to and controlled by the processor to transmit data, wherein the processor is to enable one or more antennas to be turned off during a use of the apparatus to reduce power consumption of the apparatus, wherein the number of antennas to be turned off is based on a data rate at the apparatus being above a first predetermined threshold and a signal quality of data at the apparatus being above a second predetermined threshold.

7. An apparatus comprising:
   a processor; and
   a radio frequency (RF) transmitter having a plurality of digitally controlled phased array antennas coupled to and controlled by the processor to transmit data, wherein the processor is to enable one or more antennas to be turned off during a use of the apparatus to reduce power consumption of the apparatus, wherein the number of antennas to be turned off is based on a feedback of a data rate at a device at another location being above a first predetermined threshold and a signal quality at the device at the another location being above a second predetermined threshold.

8. An apparatus comprising:
   a processor; and
   a radio frequency (RF) transmitter having a plurality of digitally controlled phased array antennas coupled to and controlled by the processor to transmit data, wherein the processor is to enable one or more antennas to be turned off during a use of the apparatus to reduce power consumption of the apparatus, wherein one or more selected antennas to be turned off are based on a data rate at the apparatus being above a first predetermined threshold and a signal quality of data at the apparatus being above a second predetermined threshold.

9. An apparatus comprising:
   a processor; and
   a radio frequency (RF) transmitter having a plurality of digitally controlled phased array antennas coupled to and controlled by the processor to transmit data, wherein the processor is to enable one or more antennas to be turned off during a use of the apparatus to reduce power consumption of the apparatus, wherein one or more selected antennas to be turned off are based on a feedback of a data rate at a device at another location being above a first predetermined threshold and a signal quality at the device at the another location being above a second predetermined threshold.

10. A method comprising:
    detecting a power source of a wireless device, the wireless device comprising a processor and a radio frequency (RF) transmitter having a plurality of digitally controlled phased array antennas coupled to and controlled by the processor to transmit data; and
    enabling one or more antennas to be turned off during a use of the wireless device based on the power source to reduce power consumption of the wireless device, the one or more antennas turned off based on at least one of i) a data rate at the wireless device being above a first predetermined threshold and a signal quality of data at the wireless device being above a second predetermined threshold, and ii) a feedback of a data rate at another wireless device at another location being above a third predetermined threshold and a signal quality at another wireless device at another location being above a fourth predetermined threshold.

11. The method of claim 10 wherein the wireless device further comprises a plurality of power amplifiers corresponding to the plurality of digitally controlled phased array antennas.

12. The method of claim 11 further comprising:
turning off a power amplifier associated with an antenna to be turned off.

13. The method of claim 10 further comprising:
turning off one or more antennas when the power source of the wireless device is a battery.

14. The method of claim 10 further comprising:
turning on all antennas when the power source of the wireless device is an AC power supply.

15. A method comprising:
detecting a power source of a wireless device, the wireless device comprising a processor and a radio frequency (RF) transmitter having a plurality of digitally controlled phased array antennas coupled to and controlled by the processor to transmit data;
enabling one or more antennas to be turned off during a use of the wireless device based on the power source to reduce power consumption of the wireless device; and
turning off a number of antennas based on a data rate at the wireless device being above a first predetermined threshold and a signal quality of data at the wireless device being above a second predetermined threshold.

16. A method comprising:
detecting a power source of a wireless device, the wireless device comprising a processor and a radio frequency (RF) transmitter having a plurality of digitally controlled phased array antennas coupled to and controlled by the processor to transmit data;
enabling one or more antennas to be turned off during a use of the wireless device based on the power source to reduce power consumption of the wireless device; and
turning off a number of antennas based on a feedback of a data rate at another wireless device being above a first predetermined threshold and a signal quality at the another wireless device at the another location being above a second predetermined threshold.

17. A method comprising:
detecting a power source of a wireless device, the wireless device comprising a processor and a radio frequency (RF) transmitter having a plurality of digitally controlled phased array antennas coupled to and controlled by the processor to transmit data;
enabling one or more antennas to be turned off during a use of the wireless device based on the power source to reduce power consumption of the wireless device; and
selecting one or more antennas to be turned off based on a data rate at the wireless device being above a first predetermined threshold and a signal quality of data at the wireless device being above a second predetermined threshold.

18. A method comprising:
detecting a power source of a wireless device, the wireless device comprising a processor and a radio frequency (RF) transmitter having a plurality of digitally controlled phased array antennas coupled to and controlled by the processor to transmit data;
enabling one or more antennas to be turned off during a use of the wireless device based on the power source to reduce power consumption of the wireless device; and
selecting one or more antennas to be turned off based on a feedback of a data rate at another location being above a first predetermined threshold and a signal quality at the another wireless device at the another location being above a second predetermined threshold.

19. A program non-transitory tangible storage device readable by a machine, tangibly embodying a program of instructions executable by the machine to perform a method, the method including:
detecting a power source of a wireless device, the wireless device comprising a processor and a radio frequency (RF) transmitter having a plurality of digitally controlled phased array antennas coupled to and controlled by the processor to transmit data; and
enabling one or more antennas to be turned off during a use of the wireless device based on at least one of i) a data rate at the wireless device being above a first predetermined threshold and a signal quality of data at the wireless device being above a second predetermined threshold, and ii) a feedback of a data rate at another location being above a third predetermined threshold and a signal quality at a device at another location being above a fourth predetermined threshold to reduce a power consumption of the wireless device.

20. The program non-transitory tangible storage device of claim 19 wherein the wireless device further comprises a plurality of power amplifiers corresponding to the plurality of digitally controlled phased array antennas.

21. The program non-transitory tangible storage device of claim 19 wherein the method further comprises:
turning off a power amplifier associated with an antenna to be turned off.

22. An wireless transceiver comprising:
a plurality of adaptive beamforming antennas to transmit data; and
a processor coupled to the plurality of antennas to enable one or more antennas to be turned off to reduce power consumption of the wireless transceiver while maintaining a minimum predetermined signal quality threshold, the one or more antennas turned off based on at least one of i) a data rate at the wireless transceiver being above a first predetermined threshold and a signal quality of data at the wireless transceiver being above a second predetermined threshold, and ii) a feedback of a data rate at a device at another location being above a third predetermined threshold and a signal quality at a device at another location being above a fourth predetermined threshold.

* * * * *